US012080980B2

(12) United States Patent
Meier et al.

(10) Patent No.: US 12,080,980 B2
(45) Date of Patent: Sep. 3, 2024

(54) CONTACT ELEMENT AND CONDUCTOR TERMINAL FOR CONNECTING AN ELECTRICAL CONDUCTOR

(71) Applicant: WAGO Verwaltungsgesellschaft mbH, Minden (DE)

(72) Inventors: Henning Meier, Bueckeburg (DE); Thomas Witte, Porta Westfalica (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 112 days.

(21) Appl. No.: 17/668,199

(22) Filed: Feb. 9, 2022

(65) Prior Publication Data

US 2022/0271447 A1 Aug. 25, 2022

(30) Foreign Application Priority Data

Feb. 10, 2021 (DE) ..................... 20 2021 100 658.7

(51) Int. Cl.
*H01R 4/48* (2006.01)
*H01R 4/02* (2006.01)
(Continued)

(52) U.S. Cl.
CPC ........... *H01R 4/48185* (2023.08); *H01R 4/02* (2013.01); *H01R 4/48* (2013.01); *H01R 12/57* (2013.01); *H01R 13/629* (2013.01); *H01R 4/28* (2013.01); *H01R 9/24* (2013.01); *H01R 11/11* (2013.01); *H01R 12/50* (2013.01); *H01R 12/51* (2013.01); *H01R 12/55* (2013.01); *H01R 12/71* (2013.01);
(Continued)

(58) Field of Classification Search
CPC .......... H01R 4/4818; H01R 4/02; H01R 4/48; H01R 12/57; H01R 13/629; H01R 4/28; H01R 9/24; H01R 11/11; H01R 12/50; H01R 12/51; H01R 12/55; H01R 12/71; H01R 12/712; H01R 12/714; H01R 12/716; H01R 13/04; H01R 13/11; H01R 13/112; H01R 13/15; H01R 13/17; H01R 13/187; H01R 4/4836; H01R 4/48185
See application file for complete search history.

(56) References Cited

U.S. PATENT DOCUMENTS

2017/0033499 A1 2/2017 Fu et al.
2017/0077622 A1* 3/2017 Fu ...................... H01R 4/48275
2017/0110807 A1 4/2017 Chen et al.

FOREIGN PATENT DOCUMENTS

CN 104916929 A 9/2015
CN 205900821 U * 1/2017
(Continued)

*Primary Examiner* — Justin M Kratt
(74) *Attorney, Agent, or Firm* — Muncy, Geissler, Olds & Lowe, P.C.

(57) ABSTRACT

A contact element for connecting an electrical conductor and a conductor terminal with such a contact element are provided. The contact element includes a conductor insertion area in which there are two opposite first side walls, a first floor section connecting the first side walls and a first cover section opposite the first floor section. The first side walls, the first floor section and the first cover section limit a conductor insertion channel. One or both first side walls each have at least one spring tongue freed from the first floor section and the first cover section, which tongue forms a clamping point for clamping an electrical conductor by means of a spring force.

15 Claims, 6 Drawing Sheets

(51) Int. Cl.

| | |
|---|---|
| ***H01R 12/57*** | (2011.01) |
| ***H01R 13/629*** | (2006.01) |
| *H01R 4/28* | (2006.01) |
| *H01R 9/24* | (2006.01) |
| *H01R 11/11* | (2006.01) |
| *H01R 12/50* | (2011.01) |
| *H01R 12/51* | (2011.01) |
| *H01R 12/55* | (2011.01) |
| *H01R 12/71* | (2011.01) |
| *H01R 13/04* | (2006.01) |
| *H01R 13/11* | (2006.01) |
| *H01R 13/15* | (2006.01) |
| *H01R 13/17* | (2006.01) |
| *H01R 13/187* | (2006.01) |

(52) U.S. Cl.
CPC .......... *H01R 12/712* (2013.01); *H01R 12/714* (2013.01); *H01R 12/716* (2013.01); *H01R 13/04* (2013.01); *H01R 13/11* (2013.01); *H01R 13/112* (2013.01); *H01R 13/15* (2013.01); *H01R 13/17* (2013.01); *H01R 13/187* (2013.01)

(56) References Cited

FOREIGN PATENT DOCUMENTS

| | | | | | |
|---|---|---|---|---|---|
| DE | 202015104961 | U1 | | 12/2016 | |
| DE | 202020100409 | U1 | | 2/2020 | |
| EP | 242318 | A | * | 10/1987 | ........... H01R 13/422 |
| KR | 20190095209 | A | * | 8/2019 | |
| KR | 1020190095209 | A | | 7/2020 | |
| WO | WO-2018210599 | A1 | * | 11/2018 | ............. H01R 11/05 |

* cited by examiner

CONTACT ELEMENT AND CONDUCTOR TERMINAL FOR CONNECTING AN ELECTRICAL CONDUCTOR

This nonprovisional application claims priority under 35 U.S.C. § 119(a) to German Patent Application No. 20 2021 100 658.7, which was filed in Germany on Feb. 10, 2021, and which is herein incorporated by reference.

BACKGROUND OF THE INVENTION

Field of the Invention

The present invention relates to a contact element for connecting an electrical conductor. The invention also relates to a conductor terminal with such a contact element.

Description of the Background Art

A contact element for connecting an electrical conductor is known, for example, from DE 20 2015 104 961 U1, which is incorporated herein by reference. The contact element there already combines a variety of advantageous properties.

SUMMARY OF THE INVENTION

It is therefore an object of the present invention to provide a further improved contact element and a conductor terminal formed therewith.

In an exemplary embodiment, a contact element for connecting an electrical conductor can comprises that the contact element has a conductor insertion area in which there are two opposite first side walls, a first floor section connecting the first side walls and a first cover section opposite the first floor section, wherein the first side walls, the first floor section and the first cover section limit a conductor insertion channel, one or both first side walls each have at least one spring tongue freed from the first floor section and the first cover section, which forms a clamping point for clamping an electrical conductor by means of spring force.

This creates a contact element that can be manufactured very compactly and is therefore also suitable for connecting electrical conductors in devices in which there is little available installation space. The contact element allows for a very reliable connection of the electrical conductor by means of spring force and at the same time simple operation.

The conductor insertion channel is formed at least in the conductor insertion area by the first side walls, the first floor section and the first cover section. If the contact element is used in a conductor terminal that has a housing, a conductor insertion opening of the housing may form a further part of a conductor insertion channel, which is upstream and/or downstream of the first side walls, the first floor section and the first cover section.

If only one of each of the first side walls has a spring tongue, the clamping point between this spring tongue and a counter bearing formed by another component may be formed. If both first side walls have a spring tongue, then these spring tongues are arranged in an advantageous design in such a way that the clamping point is formed between these spring tongues, in particular between their free ends. The one spring tongue or the two spring tongues can each have a clamping edge at the free end. This makes the clamping of the electrical conductor even more reliable and safer.

The contact element can have a tunnel-shaped conductor receiving section, which is arranged at the end of the contact element situated opposite the conductor insertion area and/or behind the clamping point as viewed from the conductor insertion area. By means of such a tunnel-shaped conductor receiving section, the clamped electrical conductor is also guided behind the clamping point, and a possible lateral displacement is limited. The tunnel-shaped conductor receiving section causes the electrical conductor to be bundled in the end area of the contact element. In particular, excessive splicing of the free strand ends can be avoided with a strand conductor.

The tunnel-shaped conductor receiving section can have two opposite second side walls, a second floor section connecting the second side walls and a second cover section opposite the second floor section. The tunnel-shaped conductor receiving section is thus essentially square, wherein pronounced corners must not necessarily be present, but corner areas can also be rounded. The tunnel-shaped conductor receiving section is thus built similar to the conductor insertion area, wherein the dimensions of the individual sections and walls in the conductor insertion area and in the tunnel-shaped conductor receiving section may differ. The cover sections of the conductor insertion area and the tunnel-shaped conductor receiving section may be spaced apart by a space between them. The first side walls can be separated from the second side walls by a space between them. Either no material can be arranged in the space between them, so that it is a free space, or other components that are not part of the contact element can be arranged there. Between the first and the second side walls, the spring tongue or the spring tongues can also extend.

The first floor section can be distanced by an intermediate section from the second floor section. The intermediate section may, for example, have a guide element for guiding the electrical conductor in the area of the clamping point. The first floor section and/or the intermediate section may have an area running diagonally to the conductor insertion direction, through which the electrical conductor is led to the clamping point. In particular, the clamping point may be arranged in the area of the intermediate section.

The contact element can have a continuous floor part comprising the first floor section and the second floor section. The floor part may include the intermediate section. The floor part may in particular be a one-piece molded floor part comprising the first floor section, the second floor section and the intermediate section.

The contact element can have a conductor stop integrated in the tunnel-shaped conductor receiving section to limit the insertion depth of the electrical conductor into the contact element. As a result, the tunnel-shaped conductor receiving section has an additional functionality to limit the insertion depth of the electrical conductor. Accordingly, no separate component needs to be provided for this function. In this way, the contact element can be provided particularly compactly and cost-effectively, as no or only a few assembly steps are necessary. With the integrated conductor stop, the tunnel-shaped conductor receiving section forms a receiving cage for the electrical conductor. For example, the conductor stop may be bent from one of the two side walls of the conductor receiving section or from the cover section of the conductor receiving section or may be bent as a combination of the two side walls or of at least one side wall and the cover section.

The contact element can have a conductor guide tab integrated on the tunnel-shaped conductor receiving section. As a result, the functionality of the tunnel-shaped conductor receiving section can be supplemented and made more diverse. By means of such a conductor guide tab, the electrical conductor can also be guided in the desired way, in particular in an area behind the clamping point. This is particularly advantageous for strand-shaped conductors, in which the splicing of the free end is minimized by such a conductor guide tab.

The conductor guide tab can protrude from the second cover section diagonally to the conductor insertion direction in the direction of the conductor insertion area. This allows for a structurally particularly favorable arrangement of the conductor guide tab that is easy to implement. The conductor guide tab may be arranged in particular on the side of the second cover section facing the clamping point and bent away from the second floor section.

The contact element can have a conductor guide tongue that protrudes from the first cover section diagonally to the conductor guide direction in the direction of the clamping point. This has the advantage that the electrical conductor is additionally guided in or behind the conductor insertion area upstream of the clamping point. For example, the conductor insertion tongue forms a flat plane. However, it is also conceivable that the conductor insertion tongue has a channel-shaped depression. This has the advantage that the conductor guidance is further improved. The channel-shaped depression can be aligned at least in sections in the conductor insertion direction. The channel-shaped depression can be arranged in the middle of the conductor guide tongue.

Due to the combination of the conductor guide tab and the conductor guide tongue, the contact element can be realized with a run-on slope for guiding the electrical conductor at two different points.

The first cover section can be formed by a material section bent from a first side wall and directed in the direction of the other first side wall. In this way, the first cover section is formed only by one material section, namely by bending a material area from a first side wall. The first cover section can extend from one side wall all the way up to the other first side wall, or it can end before reaching the other first side wall.

The first cover section can be formed by two material sections, wherein each of the two material sections is bent from a first side wall in the direction of the other first side wall, wherein a separating joint is formed between the two material sections. This has the advantage that the two material sections that form the first cover section can be comparatively short. The two material sections can be the same length or different lengths. The two material sections can protrude almost up to each other, so that the separating joint is comparatively narrow, e.g., in the range of less than 0.5 mm. This allows for simple and efficient production of a contact element that is very durable.

The separating joint can run at least partially transversely to the conductor insertion direction. As a result, the contact element can be designed to be even more durable in the area of the first cover section. The separating joint can be, for example, serrated or formed by interlocking material sections. The separating joint can, for example, run at least piece by piece at an angle to the conductor insertion direction or at an angle of 90 degrees to the conductor insertion direction.

The contact element can have two conductor guide tongues, each protruding from one of the two material sections that form the first cover section, diagonally to the conductor insertion direction in the direction of the clamping point. In this way, an advantageous conductor guidance of the electrical conductor in front of the clamping point can be provided by the appropriate design of the two material sections that form the first cover section. A separating joint may also be formed between the two conductor guide tongues. In this case, a separating joint can also be formed between the two conductor guide tongues. The separating joint between the two conductor guide tongues may be formed in extension of the separating joint between the two material sections that form the first cover section. The two conductor guide tongues may be formed as at least predominantly parallel conductor guide tongues. However, the two conductor insertion tongues can also be positioned at least partially funnel-shaped to each other, so that the two planes of the two conductor insertion tongues form an angle to each other. The separating joint between the conductor guide tongues can run at least partially transversely to the conductor insertion direction, for example in a serrated or toothed manner.

Regardless of whether the contact element has only one conductor guide tongue or the two conductor guide tongues mentioned, the respective conductor guide tongue can run above a plane that is spanned by the front edges of the spring tongues facing the first cover section. The respective conductor guide tongue can be designed in such a way that it ends in the conductor insertion direction in front of the clamping point.

The contact element can have at least one solder connection surface for the surface mounting of the contact element on a printed circuit board. In this way, the contact element can be used like an SMD component (SMD—surface mounted device) in electronics production. For example, the at least one solder connection surface may be arranged on the side of the floor part facing away from the clamping point, e.g., in the area of the first and/or the second floor section. The contact element can also have several solder connection surfaces. In this way, the contact element can be attached particularly securely to a printed circuit board. It is also conceivable that the first and second side walls form a solder connection surface.

The object mentioned above is also achieved by a conductor terminal for connecting an electrical conductor. The conductor terminal has a contact element of the type previously described and an insulating material housing that at least predominantly surrounds the contact element. As a result, the contact element is shielded from the outside against environmental influences and is also electrically insulated. This minimizes the risk of short circuits.

The conductor terminal can have a sliding opener for opening the clamping point by actuating at least one spring tongue. The sliding opener can thus be designed as a component of the conductor terminal. Accordingly, no external tool is required to open the clamping point, but rather the sliding opener can be used for this. The sliding opener may be designed as a linear and/or arc-shaped sliding component, which is mounted on a part of the conductor terminal, e.g., on the insulating material housing or in an area between the insulating material housing and the contact element. For example, the sliding opener may be located in the area of the first cover section and protrude on the side of the conductor insertion opening of the conductor terminal with a manual operating area. On the side facing the spring tongue, the sliding opener may have an impact area for actuating one or both spring tongues. The impact area can be designed, for example, as an area tapering in the direction of the clamping point.

The conductor terminal may also be formed without its own actuating element or with another actuating element, e.g., an actuating tab connected to the insulating material housing, an actuating pusher, or an actuating lever. If no separate actuating element is provided, a separate actuating tool can be used with which a clamping point can be opened or the clamping points of several conductor terminals arranged next to each other, for example in a receptacle, can be opened simultaneously, so that an electrical conductor can be inserted into the conductor terminal or several electrical conductors into several conductor terminals. It is also conceivable that several actuating options are available at the same time, for example an actuating pusher as well as the possibility of actuating the impact area on the suspension tongues with a separate actuating tool, by bringing the actuating tool via, for example, an opening in an insulating material housing to the impact area. The first cover section can be designed as a cover section connecting the first side walls. The second cover section can be designed as a cover section connecting the second side walls.

The contact element may be made in one piece from a sheet metal part which, depending on the design, has one, several or all of the following components: first side walls, first floor section, first cover section, spring tongue or spring tongues, second side walls, second floor section, second cover section, intermediate section, integrated conductor stop, integrated conductor guide tab, conductor guide tongue or conductor guide tongues, solder connection surface or solder connection surfaces.

One or both spring tongues may each have an actuating tongue protruding from a front edge of the respective spring tongue directed toward the first cover section. The actuating tongue may be bent out of the plane of the adjacent spring tongue section, in particular at a point adjacent to the free end of the spring tongue. The respective actuating tongue is bent outwards, i.e., in a direction pointing away from the clamping point. If there are two actuating tongues, they form a funnel shape that forms a holding funnel for an actuating element.

The respective actuating tongue can be arranged above the first cover section, the second cover section, the conductor guide tongue and/or the conductor guide tab, i.e., above at least one, several or all of these components. This has the advantage that the actuating tongues are easily accessible and can be reached from different directions by different actuating tools if necessary.

The contact element or the conductor terminal may additionally have a plug-in contact, for example a contact pin, a contact blade, or a socket contact, e.g., in the form of a fork contact. The plug-in contact can be molded in one piece with other components of the contact element. In particular, the plug-in contact can be molded in one piece with the contact element from a sheet metal part. However, the plug-in contact can also be connected as a separate component to the contact element in a form- and/or force-locked manner. The plug-in contact can protrude from the contact element in the conductor insertion direction or protrude from the contact element in a direction perpendicular to the conductor insertion direction. Any angle of 0° and 90° between the conductor insertion direction and the protruding plug-in contact is also conceivable.

It is also conceivable that the conductor terminal can be designed as a connector in which the contact element has no solder connection surfaces. In this case, it may be advantageous that, in a first step, first an electrical conductor is connected to the contact element, so that in a further step this pre-assembled unit of contact element and electrical conductor is then inserted into a housing of the conductor terminal. In addition, the contact element of the invention can be used in a comparable manner with known plug-in contacts with crimping technology. In this way, a plug-in contact and accordingly a connector system is created, which can be wired and pre-assembled in a factory wiring similar to crimping technology in order to then insert the plug-in contacts with the connected electrical conductors into an insulating material housing. Due to its spring force clamp connection, the plug-in contact according to the invention is easier and more reliable to wire, and, with the possibility of opening the clamping point again by actuating the impact surface, an electrical conductor can also be removed again, so that, for example, a rewiring can be carried out. The clamping point can be opened on a plug-in contact inserted in an insulating material housing as well as on a plug-in contact not inserted in an insulating material housing.

For the purposes of the present invention, the undefined term "a" is not to be understood as a number word. If, for example, a component is mentioned, this is to be interpreted in the sense of "at least one component". As far as angles are given in degrees, these refer to a circle dimension of 360 degrees (360°).

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
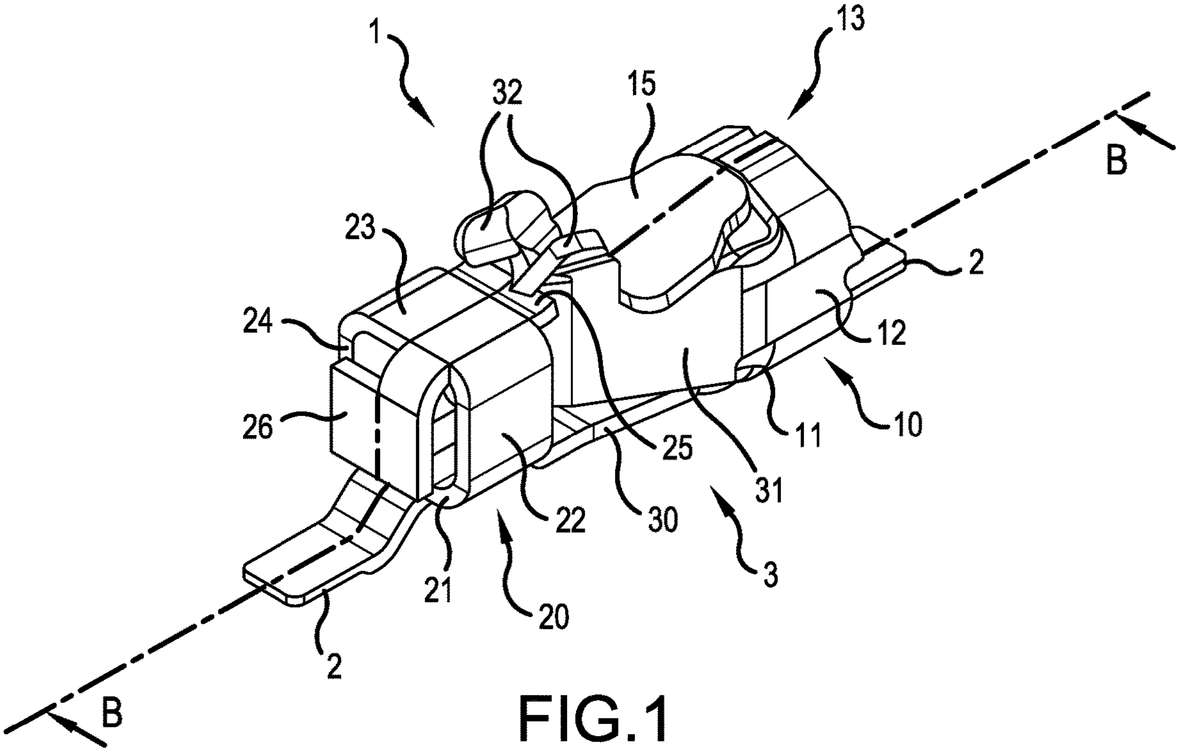
FIG. 1 is a contact element in a perspective view.
Figure 2:
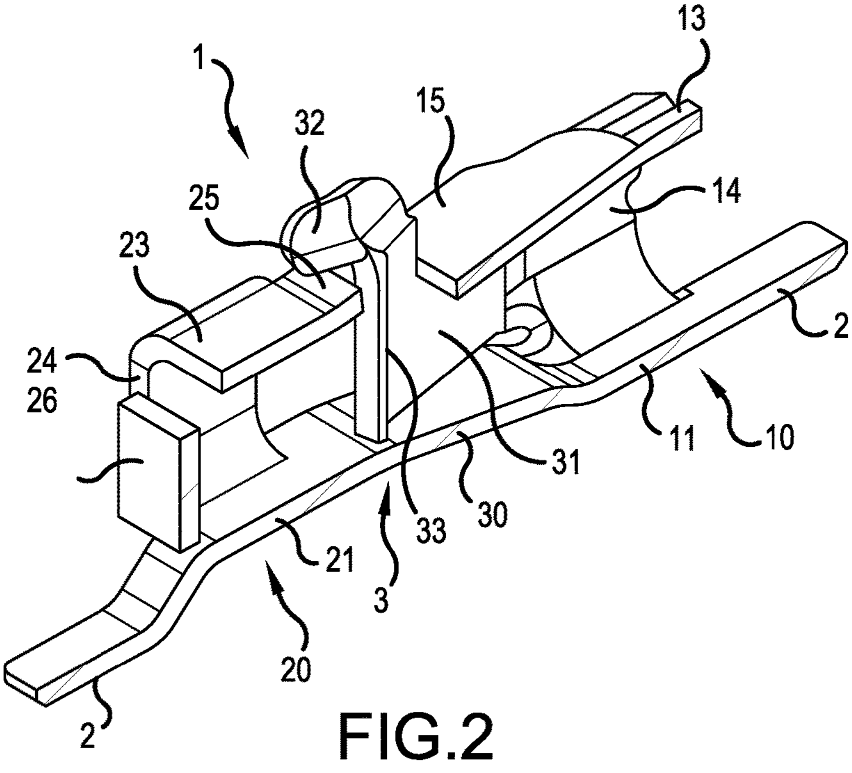
FIG. 2 is a sectional representation of the contact element according to FIG. 1.
Figure 3:
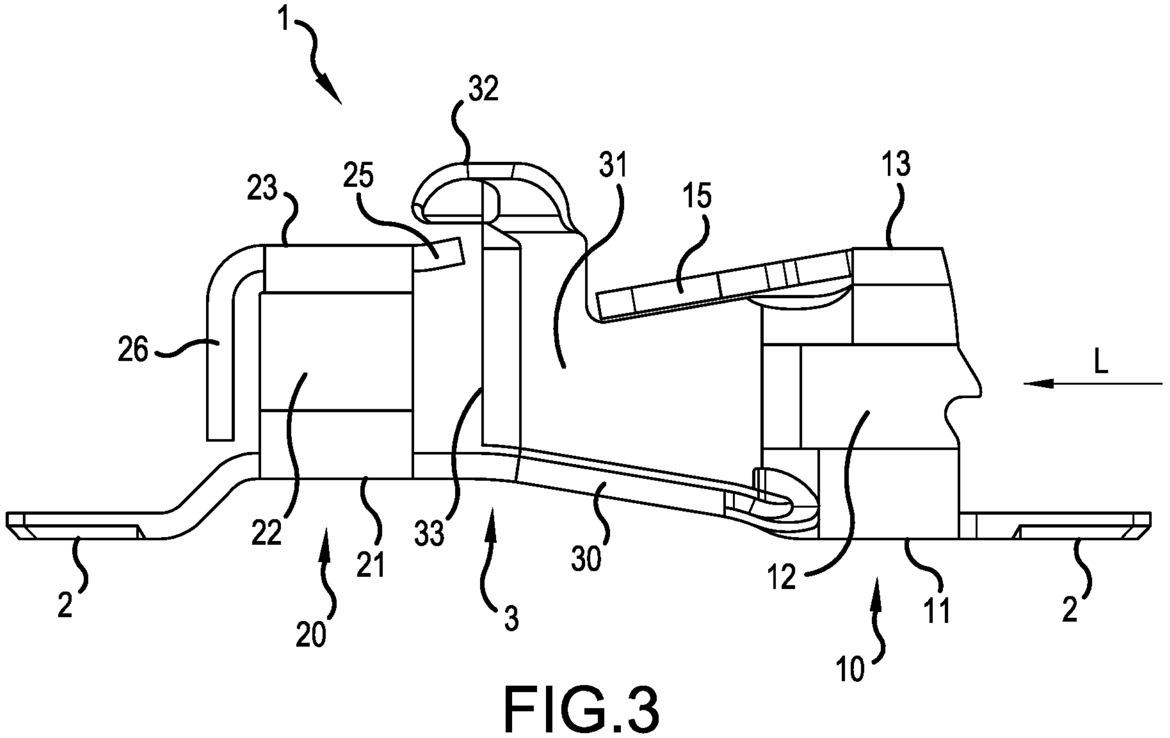
FIG. 3 is a side view of the contact element according to FIG. 1.
Figure 4:
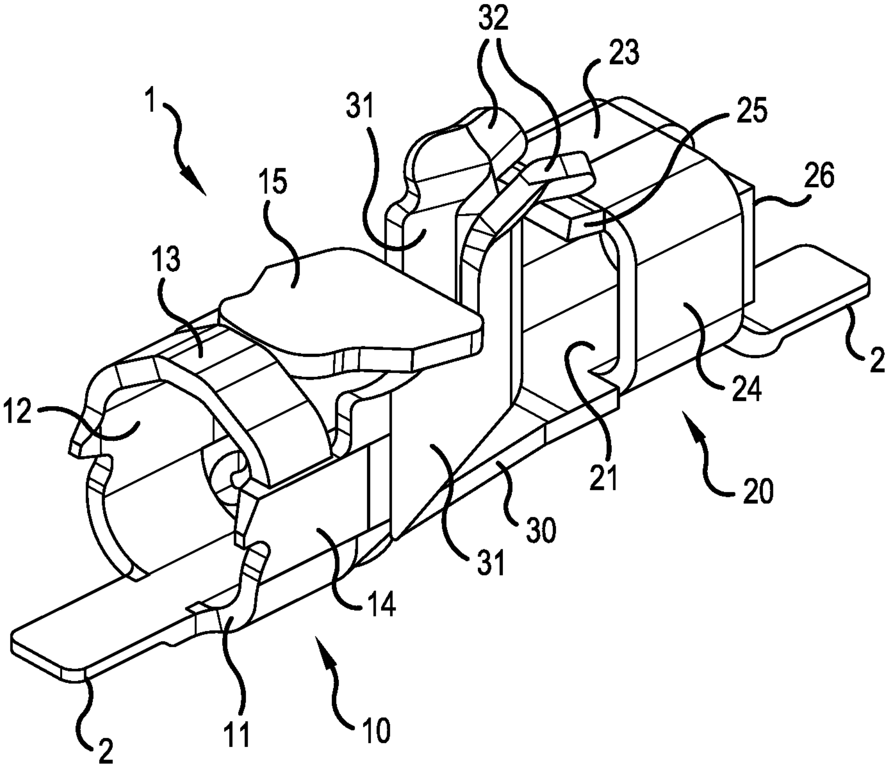
FIG. 4 is the contact element according to FIG. 1 in a different perspective view.

FIG. 1 shows a cutting plane B-B. FIG. 2 shows the conductor terminal according to FIG. 1 in a cut representation in the cutting plane B-B. The contact element 1 shown in FIGS. 1 to 4 has a conductor insertion area 10, through which an electrical conductor can be inserted into the contact element 1. In the conductor insertion direction L, behind the conductor insertion area 10, there is a clamping point 3 for clamping an electrical conductor. In the conductor insertion direction L behind the clamping point 3 there is a tunnel-shaped conductor receiving section 20.

The conductor insertion area 10 has a conductor insertion channel, which is bounded by two opposite first side walls 12, 14, a first floor section 11 connecting the first side walls 12, 14 and a first cover section 13 opposite the first floor section. The first side walls 12, 14 merge in the conductor insertion direction L into a respective spring tongue 31, which is freed from the first floor section 11 and the first cover section 13 and is therefore freely elastically deformable, independent of the first floor section 11 and the first cover section 13. The spring tongues 31 each have an actuating tongue 32, which protrudes upwards, i.e., upwards from the front edges of the spring tongues 31 facing the first cover section 13. The spring tongues 31 each have a clamping edge 33 at the free end. The clamping point 3 is formed between the clamping edges 33.

A conductor guide tongue 15 adjoins the first cover section 13 in the conductor insertion direction L, which tongue is intended for guiding the electrical conductor to the clamping point 3. The conductor guide tongue 15 protrudes from the first cover section 13 diagonally to the conductor insertion direction L in the direction of the clamping point 3 or inclined in the direction of the first floor section 11, and ends before the clamping point 3, or in the embodiment shown even before the actuating tongues 32.

The first floor section 11 merges into an intermediate section 30 in the conductor insertion direction L. The intermediate section 30 is also arranged slightly obliquely to the conductor insertion direction L for the guidance of the electrical conductor, so that the inserted electrical conductor is slightly deflected upwards by mean of the intermediate section 30, and slightly downwards by means of the conductor guide tongue 15. The conductor guide tongue 15 and the intermediate section 30 thus run towards each other in the conductor insertion direction L.

The intermediate section 30 is followed by the tunnel-shaped conductor receiving section 20. The tunnel-shaped conductor receiving section 20 has two opposite second side walls 22, 24, one second floor section 21 connecting the second side walls 22, 24, and a second cover section 23 opposite the second floor section 21. Due to the oblique arrangement of the intermediate section 30, the second floor section 21 is at a slightly higher level than the first floor section 11. The tunnel-shaped conductor receiving section 20 also has an integrated conductor stop 26, which may be formed, for example, as a material tongue starting from the second cover section 23, which is bent at an angle in the direction of the second floor section 21. In addition, an integrated conductor guide tab 25 may be available on the tunnel-shaped conductor receiving section 20. The conductor guide tab 25 may also be formed as a material tongue protruding from the second cover section 23 and in this case slightly bent upwards. In this way, the conductor guide tab 25 is arranged at an angle to the conductor insertion direction L in the direction of the conductor insertion area 10. The conductor guide tab 25 can protrude as shown from two parts of the second cover section 23 and thus be formed in two parts with a separating joint. Alternatively, the conductor guide tab 25 may also be designed in one piece, wherein the conductor guide tab 25 protrudes only from a part of the second cover section 23.

The contact element 1 may have a continuous floor part comprising the first floor section 11, the intermediate section 30 and the second floor section 21. In addition, the continuous floor part of the first floor section 11 can extend a little further counter to the conductor insertion direction, e.g., to form a solder connection surface 2 on the underside. The floor part can also extend a bit further in the conductor insertion direction L behind the second floor section 21 in order to form a further solder connection surface 2 on the underside. The contact element 1 can also have other solder connection surfaces. This is advantageous if the solder connection surfaces 2 are formed in the same plane.

Figure 5:
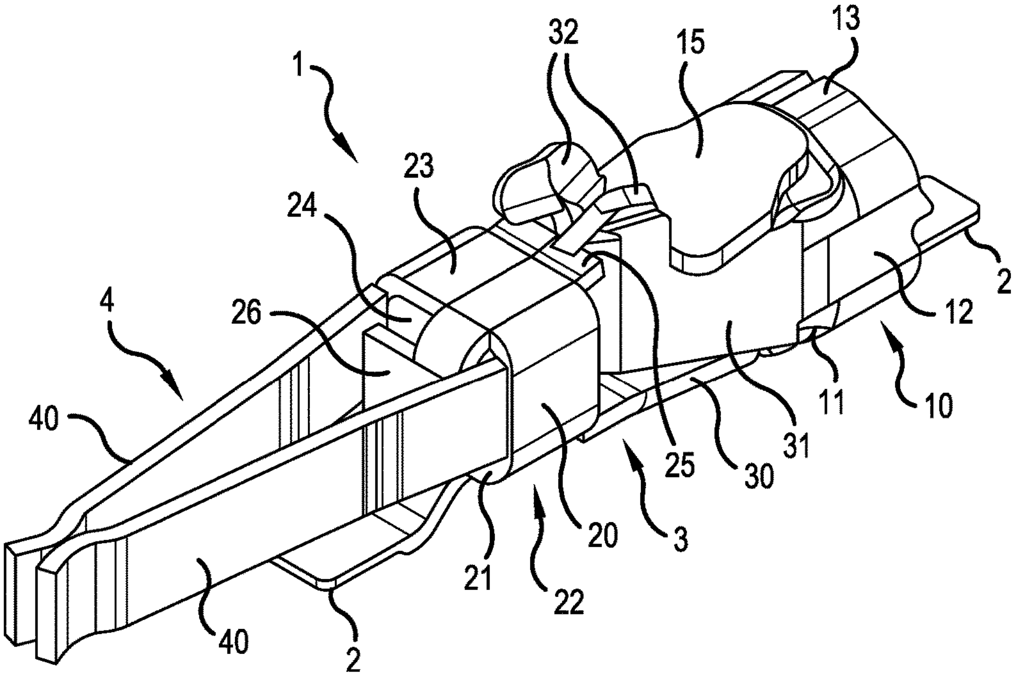
FIG. 5 is the contact element according to FIG. 1 with a plug-in contact additionally formed thereon.

The contact element 1 may additionally have a plug-in contact 4, as shown by a first example in FIG. 5. The plug-in contact 4 may be formed, for example, as a socket contact or other female contact, for example as a fork contact with two forks 40. The forks 40 may, for example, be formed in one piece from a sheet metal part with the remaining contact elements, e.g., by protruding from the second side walls 22, 24 in the conductor insertion direction L. Other arrangements of such a plug-in contact 4 are also possible, as explained below by means of further examples.

Figure 6:
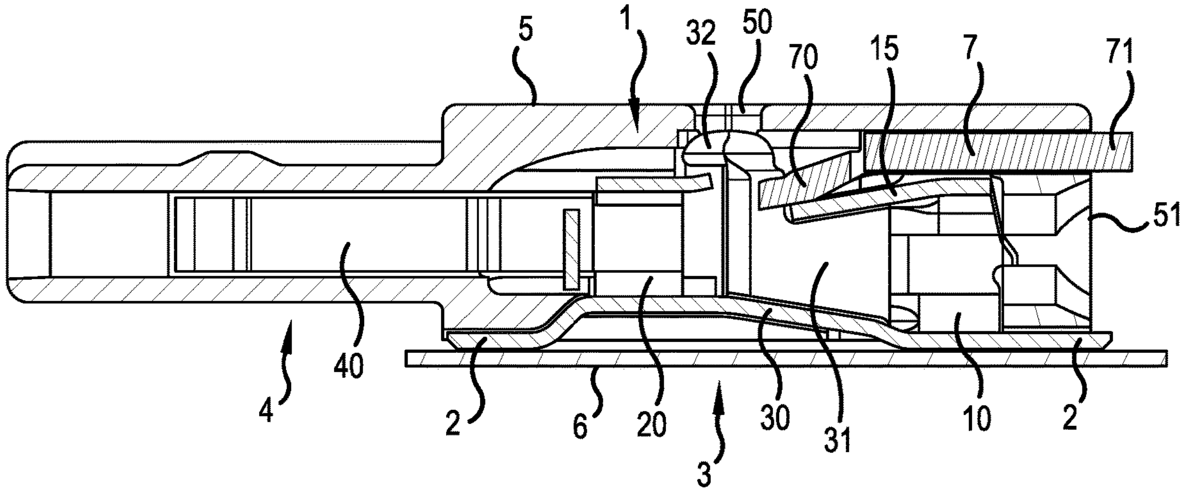
FIG. 6 is a conductor terminal with the contact element according to FIG. 5 in a lateral sectional view.

FIG. 6 shows the contact element 1 according to FIG. 5 as part of a conductor terminal, which has an insulating material housing 5 and a sliding pusher 7. Also shown by way of example is how the conductor terminal or the contact element 1 is connected to an electrical circuit board 6 via the solder connection surfaces 2.

On the side of the conductor insertion area 10, the insulating material housing 5 has a conductor insertion opening 51, which can be, for example, at least partially funnel-shaped. The insulating material housing 5 may also have an actuating opening 50, which is arranged in the area of the actuating tongues 32. In this way, a tool can be inserted through the actuating opening 50 to bring about a deflection of the actuating tongues 32 and thus of the spring tongues 31, in particular a spreading apart of the spring tongues 31 to open the clamping point.

Alternatively, or in addition to the actuating possibility through an actuating opening 50, the conductor terminal may have a sliding pusher 7, which is firmly installed in the conductor terminal. The sliding pusher 7 is arranged to be longitudinally movable in the insulating material housing 5, e.g., parallel to the conductor insertion direction L. The sliding pusher 7 has a manual operating range 71 protruding from the insulating material housing 5. At the other end, the sliding pusher 7 has an impact area 70 with which the sliding pusher 7 can apply force to the spring tongues 31 when manually operating the operating range 71, thus spreading them apart to open the clamping point.

Figure 7:
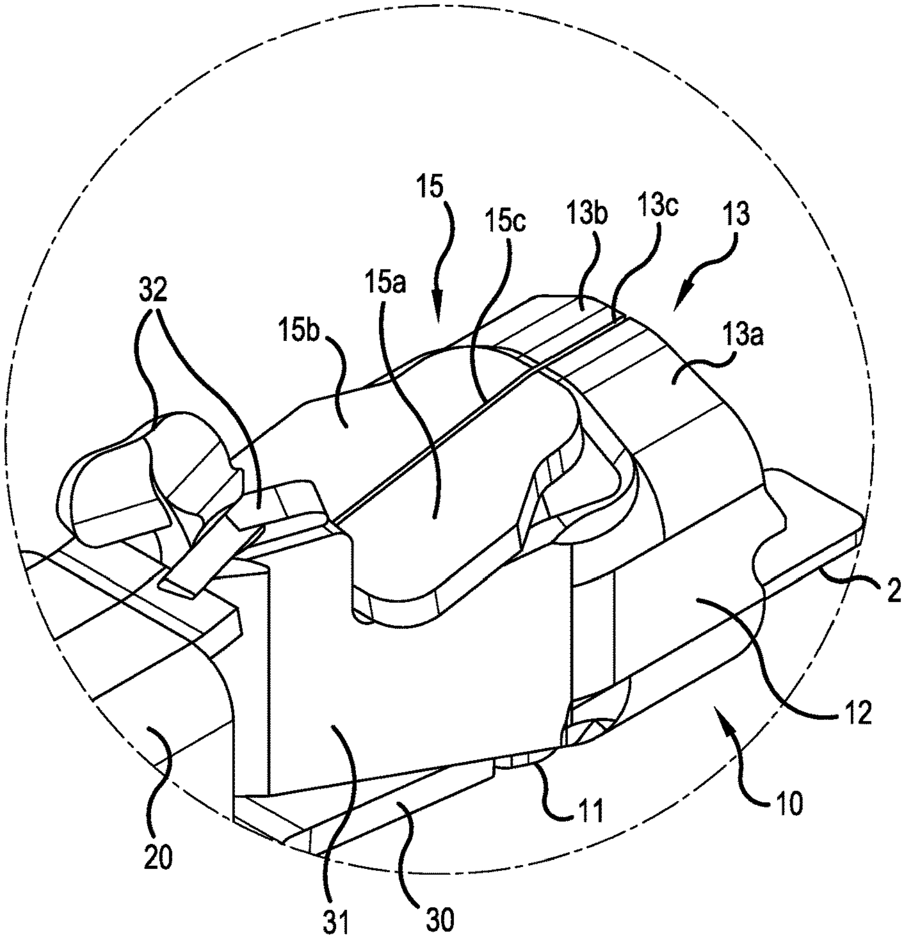
FIG. 7 is an enlarged detail view of a section of a contact element in an example.
Figure 8:
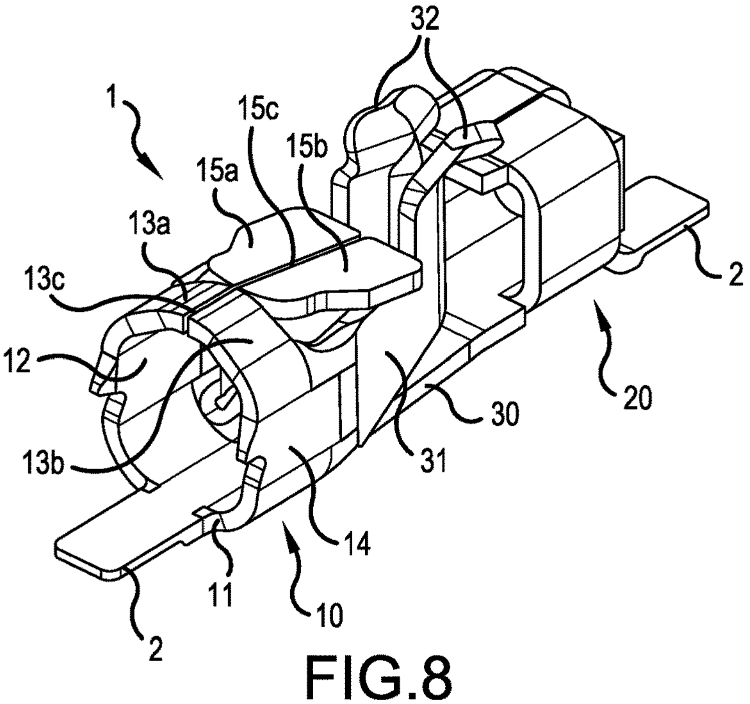
FIG. 8 is the contact element according to FIG. 7 in a perspective view.

On the basis of FIGS. 7 and 8, an embodiment of a contact element 1 is explained in which the first cover section 13 is formed by two material sections **13*a*, 13*b*, each of which is bent from a first side wall 12, 14 to the other side wall 12, 14. Between the two material sections 13*a*, 13*b* there is a separating joint 13*c*. In addition, the previously one-piece formed conductor guide tongue 15 is divided here into two separate conductor guide tongues 15*a*, 15*b*. Each of the conductor guide tongues 15*a*, 15*b* protrudes from one of the two material sections 13*a*, 13*b* diagonally in the direction of the clamping point. Between the conductor guide tongues 15*a*, 15*b* a separating joint 15*c* is formed. In this case, one conductor guide tongue 15*a* is molded in one piece with the material section 13***a*, the other conductor guide tongue 15*b* is molded in one piece with the material section 13*b*.

Figure 9:
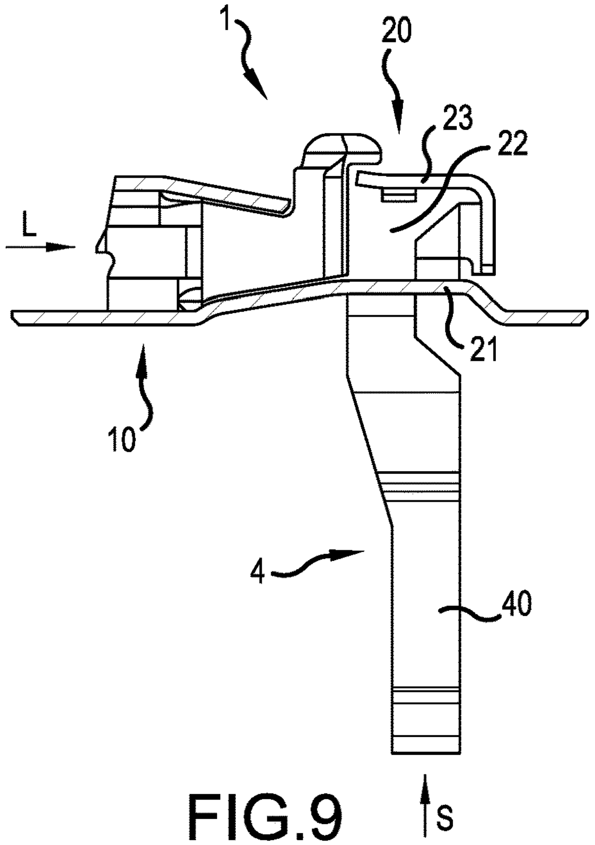
FIGS. 9,10 are further examples of a contact element in different views.
Figure 10:
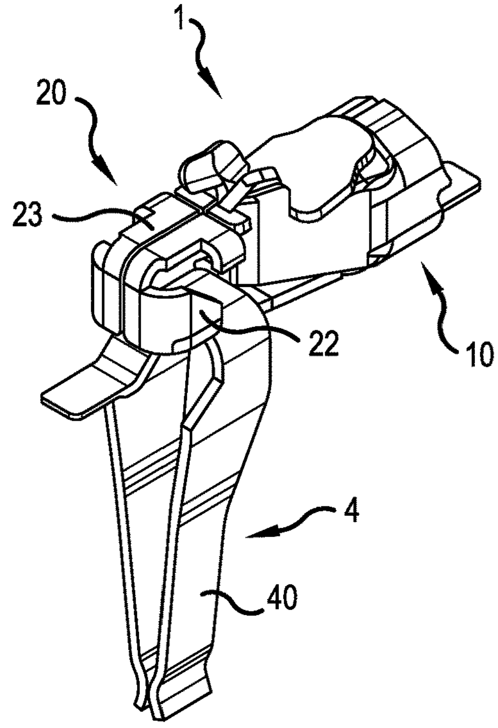

FIGS. 9 and 10 each show an embodiment of a contact element 1 with a plug-in contact 4, which in turn has two fork tongues 40. FIG. 9 shows a lateral sectional view; FIG. 10 a perspective view. Here, the plug-in contact 4 is designed for an insertion direction S, which runs perpendicular to the conductor insertion direction L. The fork tongues 40 each protrude laterally from a respective second side wall 22, 24, in this case in a direction in which they cross the second floor section 21 or are guided at a certain distance laterally along it.

Figure 11:
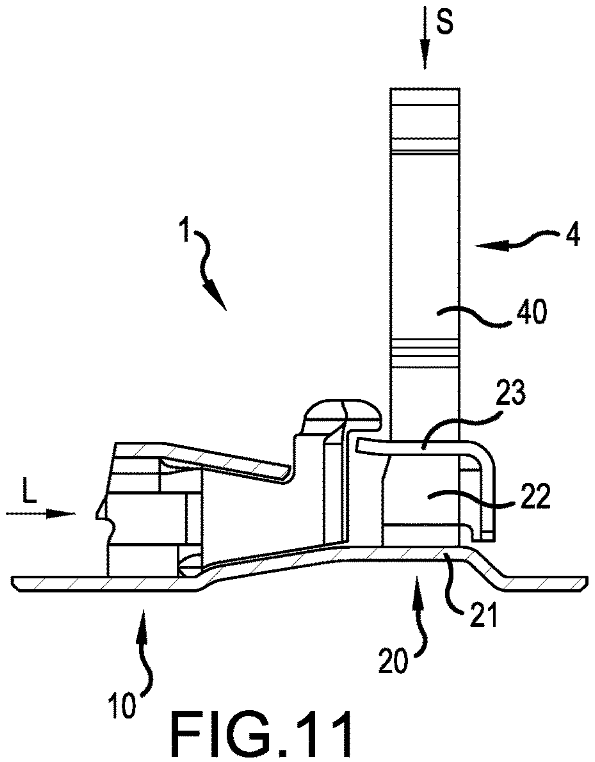
FIGS. 11,12 are further examples of a contact element in different views.
Figure 12:
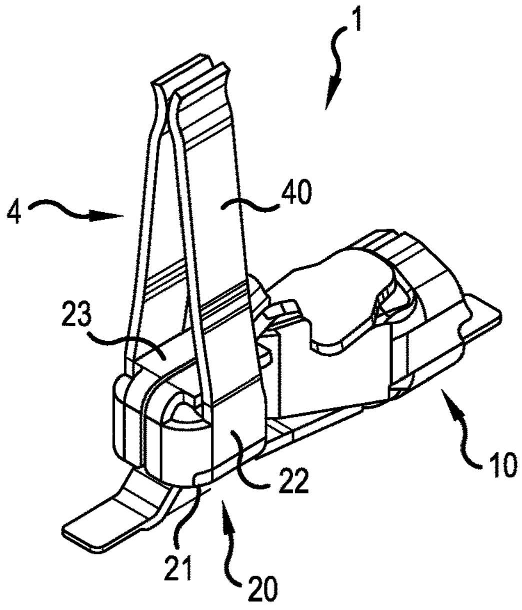

FIGS. 11 and 12 show an embodiment of a contact element with a plug-in contact 4, which is similarly designed as in FIGS. 9 and 10. FIG. 11 again shows a lateral sectional view; FIG. 12 a perspective view. In the embodiment of FIGS. 11 and 12, the insertion direction S is exactly opposite the embodiment of FIGS. 9 and 10. In this case, the fork tongues 40 protrude upwards from the second side walls 22, 24, i.e., in a direction facing away from the second floor section 21.

Figure 13:
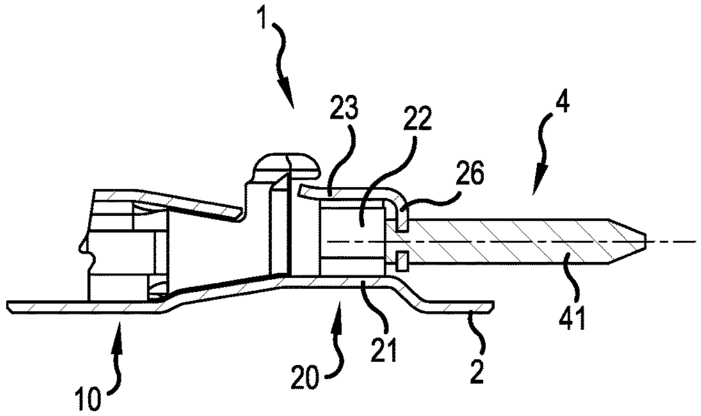
FIGS. 13,14 are further examples of a contact element in different views.
Figure 14:
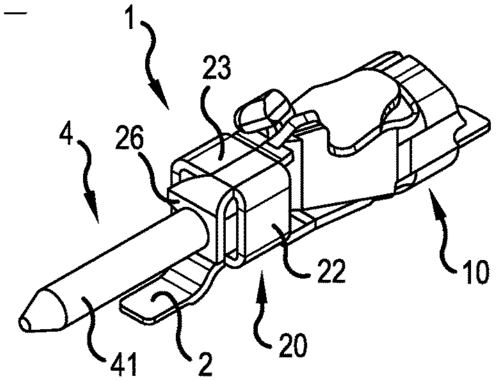
Figure 15:
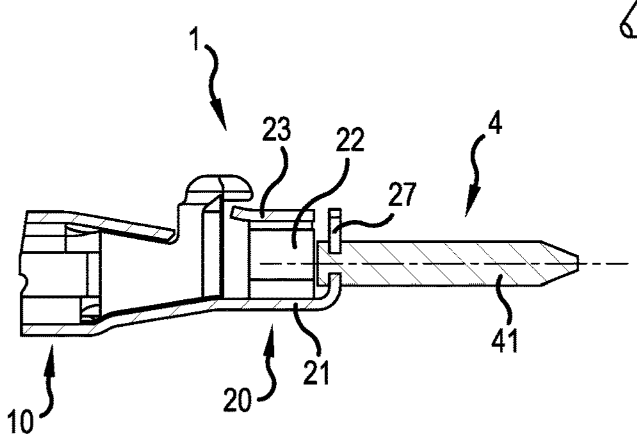
FIGS. 15,16 are further examples of a contact element in different views.
Figure 16:
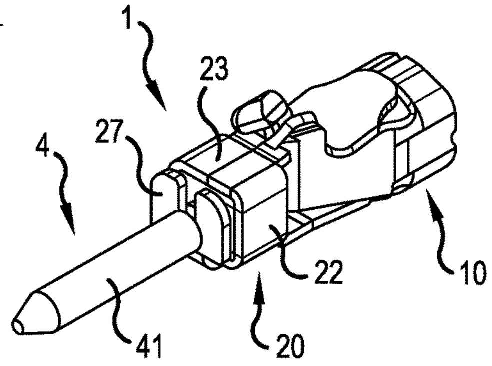
Figure 17:
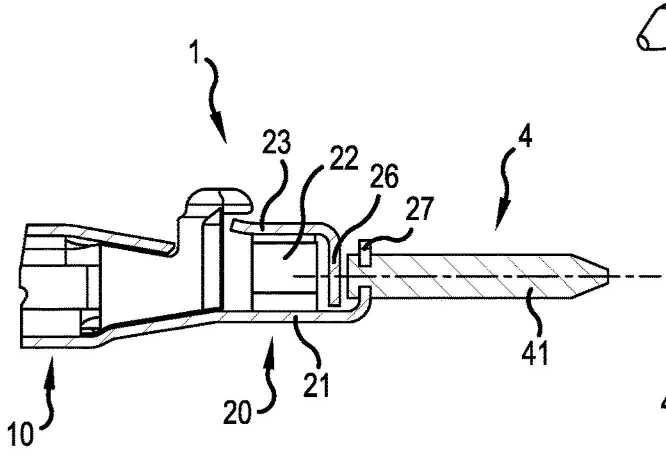
FIGS. 17,18 are further examples of a contact element in different views.
Figure 18:
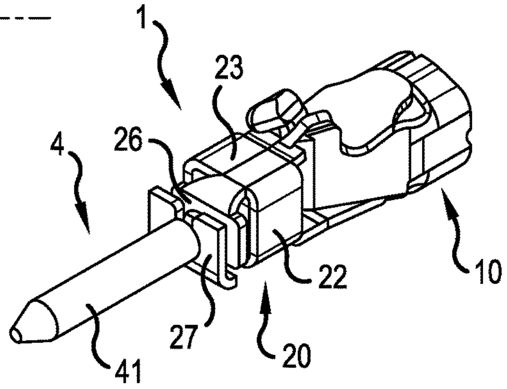

FIGS. 13 to 18 show respective embodiments of a contact element with a plug-in contact 4, which is formed as a male plug-in contact, e.g., as a contact pin 41. FIGS. 13, 15 and 17 each show lateral sectional views; FIGS. 14, 16 and 18 each show perspective views.

In the embodiment of FIGS. 13 and 14, the contact pin 41 is pressed in, screwed in, or otherwise attached in a recess formed on a material tongue, which in the previously explained embodiments forms the conductor stop 26. This allows for easy attachment of such a contact pin 41 to the contact element 1.

In the embodiment of FIGS. 15 and 16, a material tongue 27 is bent upwards from the second floor section 21, analogous to the conductor stop 26, only from the other side. The material tongue 27 has a recess in which the plug-in contact 4 is attached. The side of the plug-in contact 4 facing the contact element 1 acts as a conductor stop.

In the embodiment of FIGS. 17 and 18, both the material tongue starting from the second cover section 23, which forms the conductor stop 26, and the material tongue 27 which carries the plug-in contact 4, are present. The contact pin 41 according to FIGS. 15 to 18 can also be positioned off-center to the conductor connection. Furthermore, it is conceivable to attach the contact pin 41 also in an angled position to the contact element 1 or to use an angled contact pin.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A contact element for connecting an electrical conductor, the contact element comprising:

a conductor insertion area in which there are two opposite first side walls, a first floor section connecting the first side walls and a first cover section opposite the first floor section, wherein the first side walls, the first floor section and the first cover section limit a conductor insertion channel, and wherein the first side walls each have at least one spring tongue freed from the first floor section and the first cover section, the spring tongues forming a clamping point for clamping the electrical conductor by a spring force, wherein the contact element has a tunnel-shaped conductor receiving section having a second cover section, the tunnel-shaped conductor receiving section being arranged at the end of the contact element opposite the conductor insertion area and/or is arranged behind the clamping point as viewed from the conductor insertion area in a conductor insertion direction, wherein the contact element has a conductor guide tab integrated on the tunnel-shaped conductor receiving section, and wherein the conductor guide tab protrudes from the second cover section diagonally to the conductor insertion direction in the direction of the conductor insertion area.

2. The contact element according to claim 1, wherein the tunnel-shaped conductor receiving section has two opposite second side walls, a second floor section connecting the second side walls and the second cover section opposite the second floor section.

3. The contact element according to claim 2, wherein the first floor section is distanced from the second floor section by an intermediate section.

4. The contact element according to claim 2, wherein the contact element has a continuous floor part comprising the first floor section and the second floor section.

5. The contact element according to claim 1, wherein the contact element has a conductor stop integrated in the tunnel-shaped conductor receiving section to limit an insertion depth of the electrical conductor into the contact element.

6. The contact element according to claim 1, wherein the contact element has a conductor guide tongue, which protrudes from the first cover section diagonally to the conductor insertion direction in the direction of the clamping point.

7. The contact element according to claim 1, wherein the first cover section is formed by a material section bent from a first one of the first side walls and directed toward the other of the first side walls.

8. The contact element according to claim 1, wherein the first cover section is formed by two material sections, wherein each of the two material sections is bent from a first one of the first side walls in the direction of the other of the first side walls, and wherein a separating joint is formed between the two material sections.

9. The contact element according to claim 8, wherein the separating joint runs at least partially transversely to the conductor insertion direction.

10. The contact element according to claim 8, wherein the contact element has two conductor guide tongues, each protruding from one of the two material sections of the first cover section, the two conductor guide tongues protruding diagonally to the conductor insertion direction in the direction of the clamping point.

11. The contact element according to claim 1, wherein the contact element has at least one solder connection surface for surface mounting of the contact element on a printed circuit board.

12. The contact element according to claim 1, wherein one or both of the spring tongues have an actuating tongue protruding upwardly from a front edge of the respective spring tongue and in a direction away from the first cover section.

13. The contact element according to claim 12, wherein the respective actuating tongue is arranged above the first cover section.

14. A conductor terminal for connecting an electrical conductor, wherein the conductor terminal has a contact element according to claim 1 and an insulating material housing at least predominantly surrounding the contact element.

15. The conductor terminal according to claim 14, wherein the conductor terminal has a sliding opener for opening the clamping point by actuating the at least one spring tongue.

* * * * *